US012723845B2

(12) United States Patent
Haney

(10) Patent No.: US 12,723,845 B2
(45) Date of Patent: Sep. 1, 2026

(54) METHODS AND DEVICE FOR AUTONOMOUS MISSILE CONTROL

(71) Applicant: Brian Haney, Reno, NV (US)

(72) Inventor: Brian Haney, Reno, NV (US)

(73) Assignee: Brian Haney, Las Vegas, NV (US)

( * ) Notice: Subject to any disclaimer, the term of this patent is extended or adjusted under 35 U.S.C. 154(b) by 210 days.

(21) Appl. No.: 18/764,352

(22) Filed: Jul. 4, 2024

(65) Prior Publication Data

US 2026/0009622 A1 Jan. 8, 2026

(51) Int. Cl.

| | |
|---|---|
| ***F41G 7/22*** | (2006.01) |
| ***G05D 1/242*** | (2024.01) |
| ***G05D 1/243*** | (2024.01) |
| *G05D 101/15* | (2024.01) |
| *G05D 109/28* | (2024.01) |

(52) U.S. Cl.

CPC ........... *F41G 7/2253* (2013.01); *F41G 7/226* (2013.01); *G05D 1/242* (2024.01); *G05D 1/243* (2024.01); *G05D 2101/15* (2024.01); *G05D 2109/28* (2024.01)

(58) Field of Classification Search

CPC ....... F41G 7/2253; F41G 7/226; G05D 1/242; G05D 1/243; G05D 2101/15; G05D 2109/28; B64G 1/36; B64G 1/006; B64G 1/62; B64G 1/247; B64G 1/646; B64G 1/002; B64G 1/244

See application file for complete search history.

(56) References Cited

U.S. PATENT DOCUMENTS

| | | | | |
|---|---|---|---|---|
| 11,613,384 | B2 * | 3/2023 | Haney | G06N 3/04 701/13 |
| 12,162,630 | B2 * | 12/2024 | Haney | B64G 1/36 |
| 12,305,967 | B1 * | 5/2025 | Yi | G06N 7/01 |
| 2021/0078735 | A1 * | 3/2021 | Kapp | G06N 3/0495 |
| 2022/0187847 | A1 * | 6/2022 | Cella | G05B 19/41885 |
| 2022/0234765 | A1 * | 7/2022 | Haney | G06N 3/092 |
| 2023/0249847 | A1 * | 8/2023 | Haney | B64G 1/36 701/13 |
| 2025/0183998 | A1 * | 6/2025 | Darabi | H04B 7/18519 |
| 2025/0293764 | A1 * | 9/2025 | Darabi | B64G 1/244 |
| 2025/0326504 | A1 * | 10/2025 | Haney | B64G 1/247 |
| 2025/0333165 | A1 * | 10/2025 | Wada | B64C 13/18 |
| 2026/0036102 | A1 * | 2/2026 | Haney | F02K 9/805 |
| 2026/0093264 | A1 * | 4/2026 | Wang | G05D 1/644 |

* cited by examiner

*Primary Examiner* — Benjamin P Lee

(57) ABSTRACT

The present disclosure provides methods for controlling a guided missile to account for environmental uncertainties and maintain optimal mission performance and minimize error in hitting a defined target anywhere on Earth. First, sensors collect data about the missile's environment, passing the information to storage in the missile's database and processor. Second, the missile's processor manipulates the database with a deep reinforcement learning algorithm producing instructions. Third, the instructions command the missile's control system for optimal control, target engagement, and impact by manipulating the missile's thrust vectors for guidance. In short, the disclosure provides methods for autonomous missile control which command the missile from launch to target with certainty regardless of weather conditions, environment dynamics, or defensive missile interference.

6 Claims, 6 Drawing Sheets

METHODS AND DEVICE FOR AUTONOMOUS MISSILE CONTROL

BACKGROUND TO THE INVENTION

Field of the Invention

The invention relates to methods for missile trajectory optimization and control using deep reinforcement learning. As such, the field of this invention lies at the intersection of broader fields: missiles and artificial intelligence technologies. Missiles are weapons, often carrying explosives, used to cause harm and destruction to enemy targets. Artificial Intelligence is a sub-field of computer science focusing on machines making decisions that mirror and replicate the human mind's thoughtful processes.

Background Art

Kepler developed laws of orbital motion, the first of which states the orbit of each planet is an ellipse, with the sun at the focus. However, this step forward came with consequence as the picture of orbit that was not a perfect circle challenged conventional scientific wisdom and the image of cosmic perfection. Newton, the father of modern mechanics and mathematics, would come to alter the thought, habit, and mechanics of the world. Newton developed the foundations of calculus. Newton's work explains the laws of motion and the mechanics that set the foundation for the development of rocketry, missiles, modern orbital mathematics and the equations, making space technology possible.

Konstantin Tsiolkovsky was the first person to develop the equations proving the fundamental concepts behind rocketry. In 1903, Tsiolkovsky published the first mathematically established his theory of spaceflight. Tsiolkovsky's Rocket Equation is defined in Equation 1.

$$\Delta v = v_e \ln \frac{m_0}{m_f} = I_{sp} g_0 \ln \frac{m_0}{m_f} \quad (1)$$

In Equation 1 $\Delta v$ is the maximum change of velocity of the vehicle, $I_{sp}$ is the specific impulse, $m_0$ is the initial total mass, and $m_f$ is the final total mass without propellant for any maneuver. Tsiolkovsky's rocket equation proved foundational to the development of modern rocketry, which is largely attributed to German missile development during World War II (WWII).

German development of the V-2 missile during WWII was a vital element in turning mankind's attention toward the heavens. Wernher von Braun, the leader of the V-2 missile development program, is a central character in the story and evolution of rocketry. In October of 1942, von Braun headed a team of German scientists, who launched a V-2 missile fifty-six (56) miles high, and 120 miles downrange in the North Baltic Sea. The event was the first-time man had ever reached near-pace, now conventionally defined by the Karman line at 62.1 km above sea level. After the war ended, von Braun immigrated to the United States, later heading a group of NASA rocket scientists at Redstone Arsenal, outside Huntsville, Alabama. He continued to play a leading role in American rocket science throughout the twentieth century.

The Cold War sparked a second wave of development in rocket technology, which rapidly evolved during the 1950s and 1960s. In 1957, the Soviet Union launched Sputnik, marking the first time in human history mankind had put an object into orbit. In 1961, the Vostok 1 carried the Russian Cosmonaut Yuri Gagarin once around the Earth, making him the first human in space. In the West, the Apollo Program gave birth to one of the greatest achievements in human history. In 1969, Neil Armstrong and Buzz Aldrin became the first people in human history to step foot on the moon, as part of the Apollo 11 mission.

The present disclosure draws on this long history of developments in space technology and more specifically rocketry. Unfortunately, much outgrowth and development in space technologies evolves as a product of war. For the purpose of the securing the safety and security of the United States, the present disclosure focuses on new mechanisms for optimizing trajectory control in missile systems, which may be short-range, long-range, or space-based missiles.

Trajectory optimization is a classic control problem. Autonomous missile control systems have been in use since the 1970. Reinforcement learning type of artificial intelligence dedicated toward control optimization and intelligent decision making. describes a process by which machines learn to achieve goals. The process involves building models and developing systems for decision making, which are embedded in software programs. Reinforcement learning has been the state-of-the-art in intelligent machine technology since the 1980s. In fact, the two most significant reinforcement learning models formalize the technical process by which machines are programmed to achieve goals. As such, reinforcement learning algorithms are particularly well suited for making decision under uncertainty.

Today, Markov models serve as the foundation for reinforcement learning systems. Technically, Markov models describe the intelligent decision calculus for partially observable dynamic systems. Reinforcement learning algorithms contain three elements: (1) Model: the description of the agent-environment relationship; (2) Reward: the agent's goal; and (3) Policy: the way in which the agent makes decisions. The goal of reinforcement learning is to identify and select the policy which maximizes expected reward for an agent acting in an environment.

Formally, reinforcement learning is described through an agent-environment interaction, with the Markov Decision Process (MDP). In an MDP, the interaction begins when an agent chooses an action in the environment's initial state. The model continues to the next state, where the agent receives a reward and a set of actions from which to choose, the agent selects an action, the environment returns a reward and the next state. This process continues iteratively until the environment's final state. In short, in reinforcement learning an agent learns to take actions optimizing a reward.

In short, MDPs trace the probabilistic transitions from one state to another through time. In other words, the MDP is a statistical tool for predicting the future. Using the MDP architecture, the environment represents the problem for reinforcement learning systems. For example, in some robotics control systems, the environment is made up of states for each point in time in which the environment exists, where the actions are used for control. In other words, one way to think about states is that each state represents a moment in time, while actions represent the action taken in each moment.

States are instances of an environment and there are two types. The first is a fully observable state, where the agent directly senses the total state at each time step in the environment. In contrast, the second type of environment is partially observable. In a partially observable environment, the agent senses a fraction of the environment.

Actions are the set of possible outputs an agent gives to world. Generally, there are two types of action. The first are discrete actions, where only a finite number of moves are available to the agent. Chess is an example of a situation where an agent would take discrete actions because the moves available to an agent are always finite. By contrast, continuous actions are more commonly used for robotics control tasks like steering. In other words, continuous actions are suited for task's where actions are described as a matter of degree.

The goal for any agent in an MDP is to maximize its expected reward during an episode, which is the total of all states in an environment. In other words, the agent's goal is to maximize its total reward, rather than the reward for its immediate state. The reward acts as a feedback mechanism, allowing the agent to learn independent of human training. Rewards are used to update the agent's knowledge, so it learns to take actions returning the highest rewards over time.

For each state, the reward is a number, which is associated with a corresponding action. The principle of maximum reward states, a rational agent should choose the action maximizing expected reward. This principle controls the agent's decision-making process in its environment to optimize any reward. In other words, the basic idea is to program rational agents maximizing reward in each environment by making the best decisions. Thus, the reward is a method for teaching the agent what it should do and is meant to formalize the idea of a goal.

An important distinction in reinforcement learning is the relationship between reward and value. Reward defines the response from taking an action in each state, where the value refers to the total amount of reward over an episode. In short, reward is a measure of short-term gain and value is a measure of long-term reward. A value function computes the value of a given state. Further, the value function utilizes a discount factor to assess the reward value in the present state relative to rewards in future states.

Defining the reward for a reinforcement learning system is often one of the most challenging aspects of machine learning. The reward is easier to describe for a task like missile control, where the agent need only take actions to minimize the missile's distance from the target. However, in other tasks like writing, the reward is more difficult to define because good writing is not only subjective but involves considerable abstraction on the part of the reader. In other words, there isn't a formal list or method for describing what differentiates good writing from bad writing. As such, the mechanics of reinforcement learning are better suited to optimize more objective metrics.

Generally, deep learning systems are developed in four parts: data pre-processing, model design, training, and testing. Most of the time spent with deep learning system development is during the pre-processing stage. During this initial phase, machine learning researchers gather, organize, and aggregate data to be analyzed by neural networks. The types of data neural networks process vary. In the context of autonomous warfare systems, one example may be images stored as pixel values to be associated with object classification for targeting. Another example is gaining political insight with a dataset of publicly available personal data on foreign officials.

The goal for a particular deep learning system largely defines the data's organizational structure. In other words, the problem's definition guides the way in which data is obtained and pre-processed. For example, if a system is being developed for predictive purposes, the data may be labeled with positive and negative instances of an occurrence. Or, if the system's goal is to gain insight, the data may remain unstructured, allowing the model to complete the organization task. One of the most common forms of data, particularly for robotics controls systems, is visual data.

A deep learning system's model is the part of the system which learns and analyzes the data. The most common deep learning model is the artificial neural network (ANN). An ANN is an organized structure of interconnected neurons. The network's interconnected neurons are modeled with weight coefficients, which are adjusted through a learning process until a model is optimized for performance.

Typically, matrix multiplication and partial derivative calculations are the mathematical core for learning algorithms. Importantly, neural networks are universal function approximators, meaning they can approximate any function with desired accuracy given enough neurons. Given that all information can be represented as numbers, the neural network's ability to generalize to new information is a critical component of deep learning. Indeed, theoretically a neural network can process any information.

Interestingly, ANNs may be used for both supervised and unsupervised learning tasks. In unsupervised learning a deep neural network may be used to recognize patterns in unstructured or unlabeled data. Alternatively, in supervised learning neural networks make predictions about future occurrences.

Methods integrating deep learning and reinforcement learning technologies represent the state-of-the-art in industries across the economy. This is particularly true in the context of defense applications including cybersecurity, missile control, and space system development. And, given rapid advancements in deep reinforcement learning technology, and artificial intelligence technologies more generally, these systems' applications for missile control is of vital importance to national security. As such, there exists a need for the development of superior missile systems for both offensive and defensive tasks.

Deep Reinforcement Learning is an intelligence technique combining deep learning and reinforcement learning. However, earlier scholarship explores and explains the integration of neural networks in the reinforcement learning paradigm. Arguably, deep reinforcement learning is a method of general intelligence because of its theoretic capability to solve any continuous control task. For example, deep reinforcement learning algorithms drive state-of-the-art autonomous vehicles. Generally, there are three different frameworks for deep reinforcement learning: action-value, policy gradient, and actor-critic.

The DQN algorithm develops an optimal policy $\pi^*$ for an agent with a Q-learning algorithm. The optimal policy is the best method of decision making for an agent with the goal of maximizing reward. The Q-learning algorithm maximizes a Q-function: Q(s,a), where s is the state of an environment and a is an action in the state. In essence, by applying the optimal Q-function Q* to every state-action pair (s,a) in an environment, the agent is acting according to the optimal policy.

However, computing Q(s,a) for each state-action pair in environment is computationally expensive. Instead, the DQN algorithm approximates the value of each state state-action pair.

$$Q(s, a; \phi) \approx (s, a). \tag{2}$$

In Equation 2, ϕ represents the function parameters, which are a function's variables. The parameters are determined by a neural network using experience replay. Experience replay refers to the agent's experiences stored in memory, which are used to train the neural network to approximate the value of state-action pairs.

The neural network iterates until the convergence of the Q-function determined by the Bellman Equation.

$$Q^*(s, a) = \mathbb{E}_{s'\sim\varepsilon}\left[r + \gamma \max_{a'} Q^*(s', a')|s, a\right]. \tag{3}$$

In Equation 3, $\mathbb{E}_{s'\sim\varepsilon}$ refers to the expectation for all states, r is the reward, γ is a discount factor typically defined $0<\gamma<1$, allowing present rewards to have higher value. Additionally, the max function describes an action at which the Q-function takes its maximal value for each state-action pair. In other words, the Bellman Equation does two things; it defines the optimal Q-function and allows the agent to consider the reward from its present state as greater relative to similar rewards in future states.

Thus, the DQN algorithm combines Q-learning with a neural network to maximize reward. After the optimal policy is defined according to Equation 4.

$$\pi^* = Q^*(s', a'), \tag{4}$$

The agent engages in the exploitation of its environment. During the exploitation phase, the agent maximizes its reward by making decisions according to the optimal policy. The DQN is an off-policy algorithm, meaning it uses data to optimize performance. Indeed, DQN is essentially a reinforcement learning algorithm, where the agent uses a neural network to decide which actions to take.

A second variant of deep reinforcement learning is the Proximal Policy Optimization ("PPO") algorithm, a gradient technique. Like the DQN algorithm, the PPO algorithm is a method of model-free learning. In contrast to the DQN algorithm, PPO is an on-policy algorithm, meaning it does not learn from old data and instead directly optimize policy performance. One advantage of the PPO model is that it can be used for environments with either discrete or continuous action spaces.

In general, PPO works by computing an estimator of the policy gradient and iterating with a stochastic gradient optimization algorithm. In other words, the algorithm continuously updates the agent's policy based on the old policy's performance. The PPO update algorithm may be defined according to Equation 5.

$$\theta_{k+1} = \arg\max_{\theta} \mathbb{E}_{s,a\sim\pi_{\theta_k}}\left[L(s, a, \theta_k, \theta)\right]. \tag{5}$$

Here, $L(s,a,\theta_k,\theta)$ is the objective function, θ are the policy parameters, $\theta_k$ are the policy parameters for k experiment. Generally, the PPO update is a method of incremental improvement for a policy's expected return. Essentially, the algorithm takes multiple steps via SGD to maximize the objective.

The PPO algorithm's key to the success is obtaining good estimates of an advantage function. The advantage function describes the advantage of a particular policy relative to another policy. For example, if the advantage for the state-action pair is positive, the objective reduces to Equation 6.

$$L(s, a, \theta_k, \theta) = \min\left(\frac{\pi_\theta(a|s)}{\pi_{\theta_k}(a|s)}, (1+\epsilon)\right)A^{\pi_{\theta_k}}(s, a). \tag{6}$$

Here, $$A^{\pi_{\theta_k}}$$

is the advantage estimate for the policy given parameters $\pi_\theta(a|s)$, and the hyperparameter E corresponds to how far away the new policy can step from the old while still profiting the objective. Where the advantage is positive the objective increases and the min function puts a limit to how much the objective can increase.

The limitation on the objective increase is called clipping. The algorithm's goal is to make the largest possible improvement on a policy, without stepping so far as to cause performance collapse. To achieve this goal, PPO relies on clipping the objective function to remove incentives for the new policy to step far from the old policy. In essence, the clipping serves as a stabilizer, minimizing incentives for the policy to change dramatically.

A third variant of Deep Reinforcement Learning and an example of the actor-critic framework is the Deep Deterministic Policy Gradient ("DDPG") algorithm. Like both DQN and PPO, DDPG is a model-free learning method. However, unlike PPO, DDPG is only applicable in continuous action spaces. In form DDPG is relatively similar to DQN. DDPG is an off-policy algorithm, meaning it re-uses old data. In short, DDPG is a method of deep reinforcement learning using two function approximators, an actor and a critic.

The critic estimates the optimal action-value function a*(s). Generally, the action-value function is tailored to continuous action spaces, defined in Equation 7.

$$a^*(s) = \arg\max_a Q^*(s, a). \tag{7}$$

Here, the optimal action a*(s) is defined as a value of Q*(s,a) at which a takes its optimal value according to the Bellman Equation. The critic's role is to minimize loss, typically using a means squared error function, or target network, which gives consistent target values.

The input of the target network is derived from a replay buffer, utilizing experience replay similar to the DQN algorithm. As the process occurs, the actor is iteratively updated accordingly. To learn the optimal policy the DDPG learns a deterministic policy $\pi_\theta(s)$ which gives the action maximizing $Q_\phi(s,a)$ in Equation 8.

$$\max_\theta \mathbb{E}_{s\sim\mathcal{D}}\left[Q_\phi(s, \pi_\theta(s))\right]. \tag{8}$$

In Equation 8, the Q-function parameters $Q_\phi$ are constants and s~D is the state sampled from the replay buffer.

Ultimately, the actor decides which action to take. But, to optimize an agent's reward, after each action, the critic tells the actor defines necessary adjustment for performance improvement. The DDPG algorithm shows promise in continuous control tasks, for robotics control systems. For example, DDPG has shown state-of-the-art success for driving cars. However, the off-policy nature of the algorithm makes it much slower because it takes more computational power to train compared to the PPO and other on-policy algorithms. As computational hardware develops, quantum computers provide a faster method of computing than classical methods.

Foreign governments continue to develop advanced weapons systems for missile technology. Moreover, some governments are developing missile systems with guided artificial intelligence systems, striving toward the unification of computer perception and decision-making technologies. This technology poses a present and urgent threat to the western world. As such, it is of paramount importance that the United States immediately develop missile technologies capable of stopping foreign attacks, by force and by deterrence, with guided intelligent missile systems. Thus, there exists a need for new guided missile technology for the purpose of missile defense in the United States. The present disclosure meets that need by providing methods and a device for guided missile control using deep reinforcement learning.

SUMMARY OF THE INVENTION

Foreign governments continue to develop advanced weapons systems for missile technology. Moreover, some governments are developing missile systems with guided artificial intelligence systems, striving toward the unification of computer perception and decision-making technologies. This technology poses a present and urgent threat to the world at large because missile attacks are a common and deadly force of war. Thus, there exists a need for new guided missile technology for the purpose of missile defense via direct and indirect deterrence.

The present disclosure meets that need by providing methods and a device for guided missile control using deep reinforcement learning, a singularized form of artificial intelligence. The present disclosure provides methods and a device for autonomous missile control which can move from launch to target with optimal certainty regardless of external interference. The methods utilize machine learning to process sensor data the missile collects about the environment. The present disclosure unifies the artificial intelligence for robotics control paradigm, which has traditionally been thought to require two elements, perception and decision making. The present disclosure introduces methods for combining the two elements in a single control system for missile trajectory optimization capable of generalized and intelligent decision making.

DETAILED DESCRIPTION OF THE INVENTION

Figure 1:
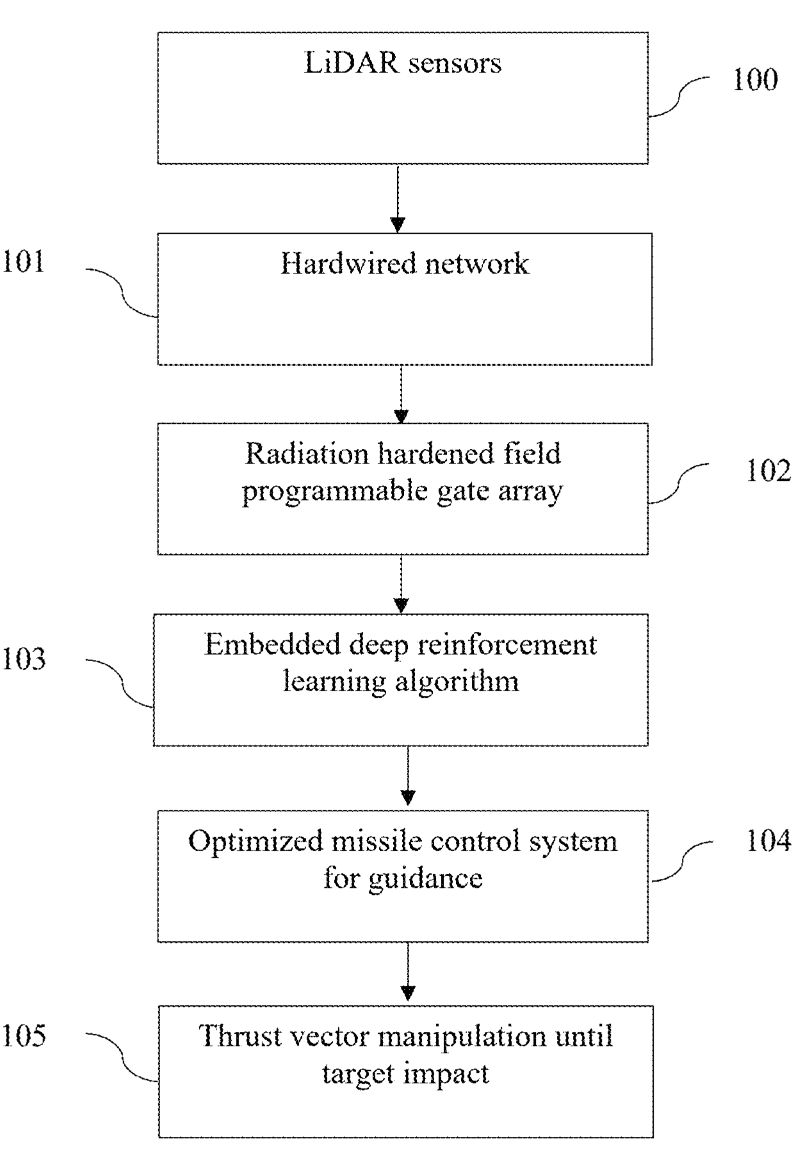
FIG. 1 is an information flow diagram for missile thrust vector manipulation.

FIG. 1 is an information flow diagram for missile thrust vector manipulation. In certain embodiments, LiDAR sensors 100 receive information about the missile's environment. A hardwired network 101 receives and relays the LiDAR sensor data. A radiation-hardened field programmable gate array 102 stores and processes the LiDAR data, performing computer vision functions. An embedded deep reinforcement learning algorithm 103 then processes the computer vision functions and identifies actions to take. The actions correspond to an optimized missile control system for guidance 104 by selecting the best action to take at each moment in the missile's trajectory. In turn, these optimized actions manipulate thrust vector controls for the missile guidance until target impact 105.

Figure 2:
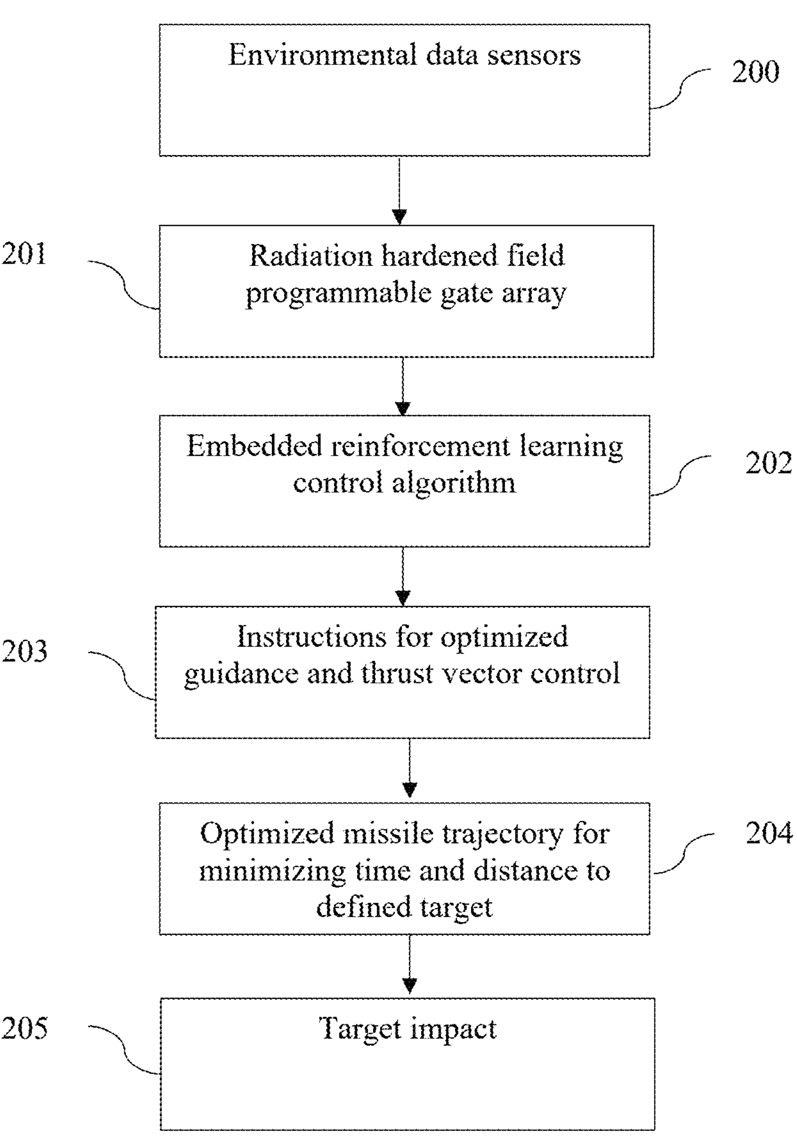
FIG. 2 is an information flow diagram for missile guidance optimization.

FIG. 2 is an information flow diagram for missile guidance optimization. In certain embodiments, various data sensors 200 receive data about the missile's environment. The data is conveyed to a radiation-hardened field programmable gate array 201, operating as the missile's on-board database and processor. An embedded reinforcement learning control algorithm 202 then manipulates the received data to develop optimal actions for computer decision making using artificial intelligence. This, in turn, generates instructions for optimized guidance and thrust vector control 203. As a result, the missile's trajectory is controlled to minimize time and distance to the defined target 204. Ultimately, the missile collides with the target for impact 205.

Figure 3:
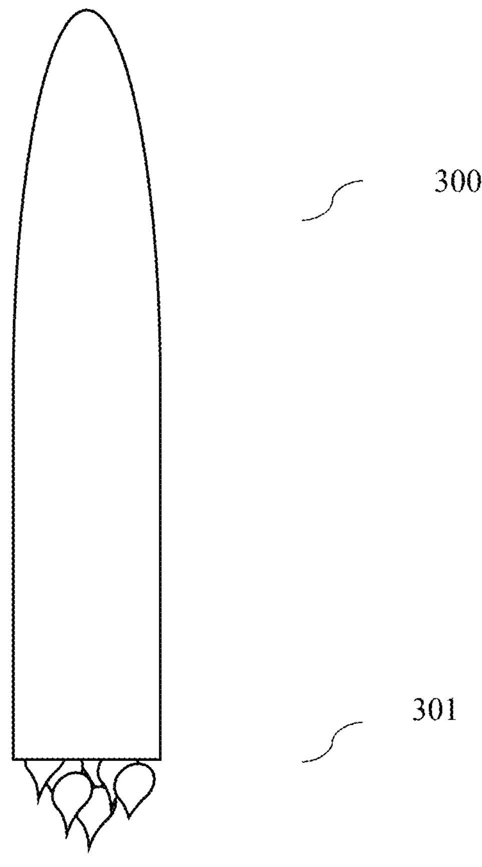
FIG. 3 is a diagram of a missile.

FIG. 3 is a diagram of a missile. In certain embodiments, the present disclosure includes a missile body with a radiation-resistant heat shield using niobium alloy 300. The missile's thrust output controls guidance 301, allowing the missile to operate in space environments, above the Karman Line, and in orbit.

Figure 4:
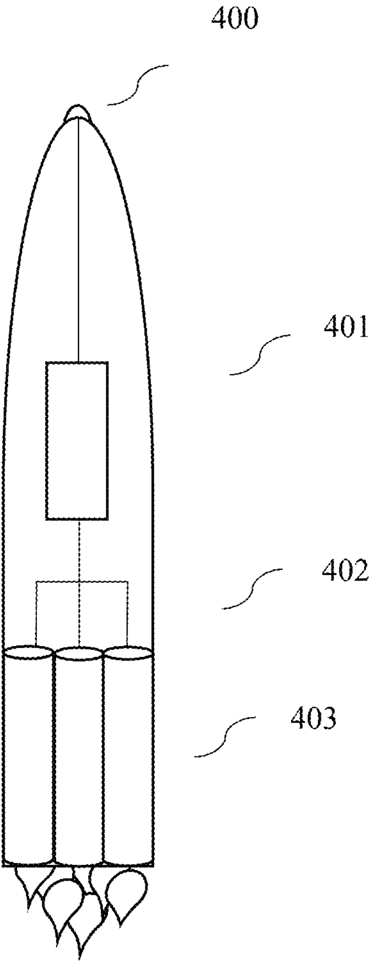
FIG. 4 is a diagram of simplified internal missile components.

FIG. 4 is a diagram of simplified internal missile components. In certain embodiments, the present disclosure includes a missile with a LiDAR sensor 400, performing computer vision and data acquisition functions. The data may be conveyed to a radiation-hardened field programmable gate array 401, which serves as an on-board database and processor for the missile. A hardwired network 402 may transfer visual data and decision instructions to intelligent thrust vector controls 403. The intelligent thrust vector controls may then control the missile for optimal guidance.

Figure 5:
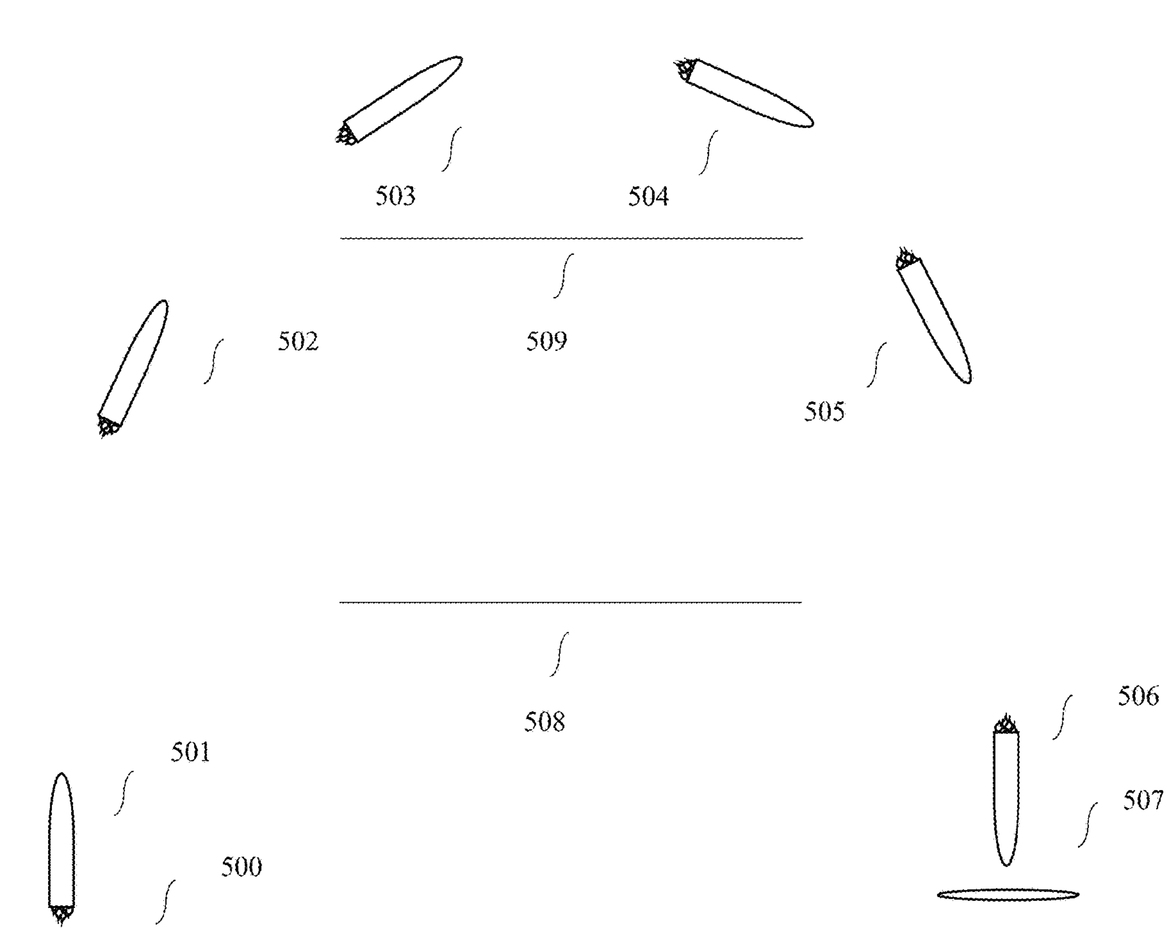
FIG. 5 is a diagram of missile trajectory.

FIG. 5 is a diagram of missile trajectory. In certain embodiments, the present disclosure includes a missile launch pad 500, where a missile starts at the launch pad 501. The missile enters a trajectory past the Karman line 502, continues in a trajectory in low-Earth orbit 503, then ignites a guided trajectory in low-Earth orbit, and begins re-entry from low-Earth orbit 504. The missile continues in a guided trajectory via powered flight above the Karman line 505 and in a guided trajectory 506 after re-entry. The missile then strikes the target 507. In such embodiments, the missile may pass the Karman line 508 and enter low-Earth orbit 509 for the purpose of long-range capability.

Figure 6:
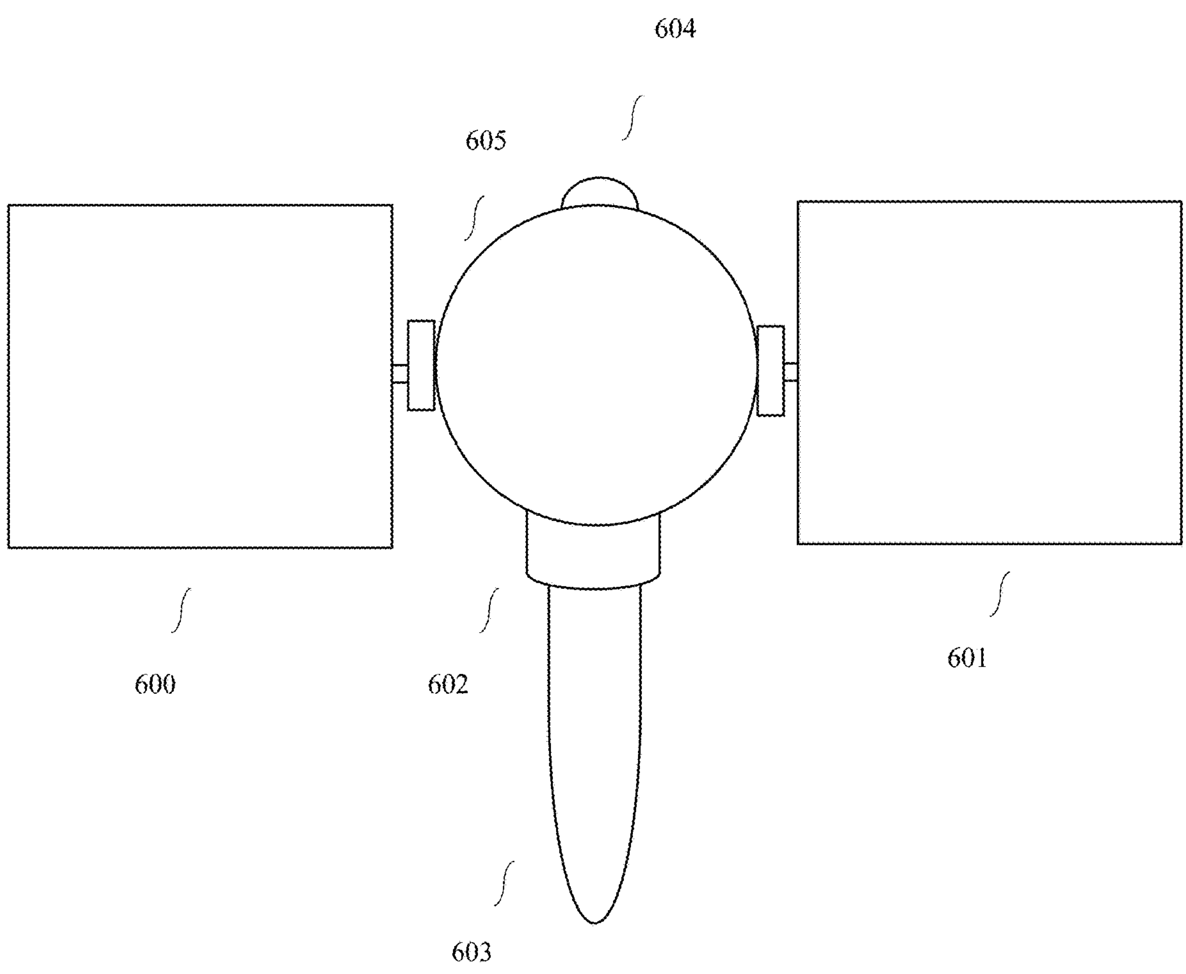
FIG. 6 is a diagram of a satellite missile system.

FIG. 6 is a diagram of a satellite missile system. In certain embodiments, the present disclosure includes a left satellite side panel 600 and a right satellite side panel 601. A satellite with a missile docking and launch mechanism 602 holds the missile in low-Earth orbit, medium Earth, or geostationary orbit. In such embodiments, the satellite includes a loaded and locked guided missile using deep reinforcement learning control 603. The satellite may also include a Space LiDAR sensor 604, which may be attached to a smart satellite body 605.

In certain embodiments, the disclosure is a method for autonomous missile control involves a missile equipped with a radiation-resistant heat shield using niobium alloy. The missile is loaded onto a satellite featuring a missile docking and launch mechanism. Upon receiving a launch command, the missile undocks from the satellite, and the launch command ignites the missile's control system. The missile is then guided using an embedded and trained deep reinforcement learning algorithm, which optimizes missile control and guidance. Throughout the flight, the missile follows an optimized trajectory, guided by a deep reinforcement learning software program. This program collects visual data and calculates decisions based on a defined policy. The policy controls thrust commands, manipulating the thrust vector valves to minimize time and distance to the defined target, ultimately striking the target accurately.

In certain embodiments, the disclosure is a device for autonomous missile control. The device comprises a missile equipped with a data sensor mounted for sensing data. This data is collected, stored, and processed onboard using a radiation-hardened field programmable gate array. An embedded deep reinforcement learning software program processes the sensor data in real-time, calculating control commands. Additionally, the program creates a point-cloud environment modeling the real world and generates commands for thrust vector controls. These thrust vector controls command the missile's thrust outputs, optimizing the missile's powered flight path by minimizing the distance from a defined target in real-time.

In certain embodiments, the disclosure is a method for autonomous missile control. The method involves a missile engaging in a trajectory toward a target, utilizing data sensors to receive data about the trajectory. This data is processed onboard using a radiation-hardened field programmable gate array, which generates a visual mechanism for action value calculation. A reinforcement learning algorithm then receives the action value calculation in real-time and generates instructions for commanding thrust vector controls, manipulating the missile body, optimizing guidance, and enabling collision avoidance. Artificial intelligence technology, comprising a neural network and a reinforcement learning computer program, is utilized for this purpose. These components are combined using a deep Q-network. Throughout powered-flight, the missile is controlled to minimize distance and time from the target, ultimately colliding directly with the target.

In certain embodiments, LiDAR sensors 100 receive information about the missile's environment. A hardwired network 101 receives and relays the LiDAR sensor data. A radiation hardened field programmable gate array 102, then stores and processes the LiDAR data, performing computer vision functions. Then, an embedded deep reinforcement learning algorithm 103, processes the computer vision functions and identifies actions to take. The actions correspond to an optimized missile control system for guidance 104, by selecting the best action to take for each moment in the missiles trajectory. In turn, these optimized actions manipulate thrust vector controls for the missile guidance until target impact 105.

In certain embodiments, various data sensors 200 receive data about the missile's environment. The data is conveyed to a radiation hardened field programmable gate array 201, operating as the missile's on-board database and processor. Then, an embedded reinforcement learning control algorithm 202, manipulates received data to develop optimal actions for computer decision making using artificial intelligence. In turn, this generates instructions for optimized guidance and thrust vector control 203. As a result, the missile's trajectory is controlled, such to be optimized missile trajectory for minimizing time and distance to defined target 204. Ultimately, the missile collides with a target for impact 205.

In certain embodiments, the present disclosure includes a missile body with radiation resistant heat shield using niobium alloy 300. In such embodiments, the missile thrust output controls guidance 301. In turn, this allows for the missile to operate in space environments, above the Karman Line and in orbit.

In certain embodiments, the present disclosure includes a missile with a LiDAR sensor 400, performing computer vision and data acquisition functions. The data may be conveyed to a radiation hardened field programmable gate array 401, which is an on-board database and processor for the missile. A Hardwired network 402, may transfer visual data and decision instructions to intelligent thrust vector controls 403. The intelligent thrust vector controls may then control the missile for optimal guidance.

In certain embodiments, the present disclosure includes a missile launch pad 500, where a missile starts at the launch pad 501. A Missile enters a trajectory past Karman line 502. Then, the missile continues in a trajectory in low-Earth orbit 503. The missile then ignites guided trajectory in low-Earth orbit and begins re-entry from low-Earth orbit 504. The missile continues in a guided trajectory via powered flight above the Karman line 505. The missile continues in a guided trajectory 506 after re-entry. Then missile then strikes the target 507. In such embodiments, the missile may pass the Karman line 508; and enter Low-Earth orbit 509 for the purpose of long-range capability.

In certain embodiments, the present disclosure includes a left satellite side panel 600 and a right satellite side panel 601. A satellite with a missile docking and launch mechanism 602 holding the missile in low-Earth orbit, medium Earth, or Geostationary orbit. In such embodiments, the satellite includes a loaded and locked guided missile using deep reinforcement learning control 603. The satellite may also include a Space LiDAR sensor 604, which may be attached to a smart satellite body 605.

In certain embodiments, LiDAR sensors 100 receive information about the missile's environment. A hardwired network 401 receives and relays the LiDAR sensor data. A radiation hardened field programmable gate array 102, then stores and processes the LiDAR data, performing computer vision functions. Then, an embedded deep reinforcement learning algorithm 103, processes the computer vision functions and identifies actions to take. In turn, this generates instructions for optimized guidance and thrust vector control 203. As a result, the missile's trajectory is controlled, such to be optimized missile trajectory for minimizing time and distance to defined target 204. Ultimately, the missile collides with a target for impact 205.

In certain embodiments, various data sensors 200 receive data about the missile's environment. The data is conveyed to a radiation hardened field programmable gate array 201, operating as the missile's on-board database and processor. Then, an embedded reinforcement learning control algorithm 202, manipulates received data to develop optimal actions for computer decision making using artificial intelligence. In such embodiments, the missile body is a radiation resistant heat shield using niobium alloy 300. In such embodiments, the missile thrust output controls guidance 301. As a result, the missile's trajectory is controlled, such to be optimized missile trajectory for minimizing time and distance to defined target 204. Ultimately, the missile collides with a target for impact 205.

In certain embodiments, the present disclosure includes a missile body with radiation resistant heat shield using niobium alloy 300. The missile is locked and loaded on a satellite with a missile docking and launch mechanism 602. The missile includes an embedded and trained deep reinforcement learning algorithm 103 for optimizing missile control and guidance 104. In such embodiments, the missile thrust output controls guidance 301. The missile follows an optimized missile trajectory for minimizing time and distance to defined target 204, until the missile strikes the defined target 507.

In certain embodiments, the present disclosure includes a missile with a LiDAR sensor 400, performing computer vision and data acquisition functions. In such embodiments, the missile body may include radiation resistant heat shield using niobium alloy 300. In such embodiments, a radiation hardened field programmable gate array 102, includes an embedded reinforcement learning control algorithm 202, producing instructions for optimized guidance and thrust vector control 203. The thrust vector control instructions power the guided missile system until it hits the defined target 507.

In certain embodiments, the present disclosure includes a missile launch pad 500, where a missile starts at the launch pad 501. LiDAR data sensors 100 receive data about the missile's environment. The data is conveyed to a radiation hardened field programmable gate array 401, operating as the missile's on-board database and processor. An embedded reinforcement learning control algorithm 202, manipulates received data to develop optimal actions for computer decision making using artificial intelligence. In such embodiments, the missile body is a radiation resistant heat shield using niobium alloy 300. In such embodiments, the missile thrust output controls guidance 301. Then missile then strikes the target 507.

In certain embodiments, the present disclosure includes a left satellite side panel 600 and a right satellite side panel 601. A satellite with a missile docking and launch mechanism 602 holding the missile in Earth orbit. In such embodiments, the satellite includes a loaded and locked guided missile using deep reinforcement learning control 603. The missile then ignites guided trajectory in low-Earth orbit and begins re-entry from orbit 504. The missile continues in a guided trajectory via powered flight above the Karman line 505. The missile continues in a guided trajectory 506 after re-entry. Then missile then strikes the target 507.

In embodiments, the present disclosure is a three-step process for intelligent missile control. First, sensors collect data about the missile's environment, passing the information to storage in the missile's database. Second, the missile's processor manipulates the database with a deep reinforcement learning algorithm producing instructions. Third, the instructions command the missile's control system for optimal control, target engagement, and impact.

In embodiments, the present disclosure includes an autonomous missile system for trajectory optimization. The methods unify the two elements for artificial intelligence robotics control, perception and decision making. For perception, the methods use deep learning. For decision making, the methods use reinforcement learning. And these two methodologies are integrated into a singular deep reinforcement learning algorithm. The unified methods control missile trajectory for various purposes including point-to-point travel. The method's goal is ensuring the missile connects to the target 507 by optimizing trajectory control mechanics 104.

In embodiments, the present disclosure provides methods for deep learning enabling intelligent missile perception. The present disclosure utilizes data from various robotics control sensors, including GPS, LiDAR, cameras, and video 200. The data is collected in a various databases and information silos, representing the missile's position in continuous state space. A deep learning system's model is the part of the system which analyzes the information.

In embodiments, the present disclosure utilizes one or more deep neural networks to identify, select, and engage with enemy targets. In the present disclosure, the reward is associated with metrics minimizing time and distance from an engaged target. The reward is a method of teaching the agent what it should do and is meant to formalize the idea of a goal. In the present disclosure the reward may be defined according to optimal trajectory metrics, including location, attitude, or velocity.

In embodiments the present disclosure identifies and selects a policy which maximizes expected reward for an agent controlling a guided missile using reinforcement learning. In such embodiments, the disclosure includes methods for selecting the optimal policy using machine learning techniques. Such machine learning techniques may utilize artificial neural networks or deep neural networks to accurately predict the optimal policy from a collection of policies.

In embodiments, in the present disclosure the environment is made up of two types of space, state spaces and action spaces. The state space is made up of a virtual data model of the target. The state space updates in real time in a database and processing system on board the missile. The missile state space is fully observable because the landing site is government by the laws of physics. Within each state space, the action space contains the decisions available to the agent in each state. The action space is continuous because the actions available for attitude control manipulation are valued vectors.

In embodiments, initially, the agent is presented with a state of the environment. Then, the agent takes an action in the present state advancing to the next state of the environment, where a reward associated with the chosen action is returned. The agent acts according to a policy. Generally, an optimal policy is developed to maximize value. In the present disclosure, the optimal policy corresponds with taking the action maximizing value to the agent. The model continues to the next state, where the agent receives a reward and a set of actions from which to choose, the agent selects an action, the environment returns a reward and the next state. This process continues perpetually until the environment's final state, which for the present disclosure is target impact.

In certain embodiments, the present disclosure includes a missile with a LiDAR sensor 100, performing computer vision and data acquisition functions. In such embodiments, the missile body may include radiation resistant heat shield using niobium alloy 300. In such embodiments, a radiation hardened field programmable gate array 401, includes a pre-trained deep reinforcement learning control algorithm 202, producing instructions for optimized guidance and thrust vector control 403. The thrust vector control instructions power the guided missile system during trajectory 506 and until connection with the defined target 507.

In certain embodiments, the present disclosure may be adapted to multiple domains of warfare. For example, a space satellite sensor 300 may be in communication with a land sensor 303 regarding offensive hypersonic missile threats. In other embodiments, the present disclosure may include additional air sensors and communications networks, as well as sea-based communication network, such as submarine sensing. In such embodiments, a multi-domain approach may be taken to ensure defensive hypersonic missile systems 302 engage with and physically deter any threatening offensive hypersonic missile 301 by following optimized flight path trajectories according to deep reinforcement learning control software 103.

In certain embodiments, a convolutional neural network may compute an approximation of value for each state-action pair.

$$Q(s, a; \phi) \approx (s, a). \tag{9}$$

In Equation 9, $\phi$ represents the function parameters, which are a function's variables. This algorithm may be trained on simulation data for the purpose of real-world testing and deployment. The state and action variables may be defined according to data labels in a point-cloud, which may result from data sensor fusion.

In certain embodiments, the behavioral algorithm may be determined by a trained agent. The neural network may iterate until the convergence of the Q-function determined by the Bellman Equation.

$$Q^*(s, a) = \mathbb{E}_{s' \sim \varepsilon}\left[r + \gamma \max_{a'} Q^*(s', a')|s, a\right]. \tag{10}$$

In Equation 10, $\mathbb{E}_{s' \sim \varepsilon}$ refers to the expectation for all states, r is the reward, $\gamma$ is a discount factor typically defined $0<\gamma<1$, allowing present rewards to have higher value. Equation 10 defines the optimal Q-function and allows the agent to consider the reward from its present state as greater relative to similar rewards in future states.

In certain embodiments, an optimal policy may pre-trained and developed in a simulation environment. After the optimal policy is defined according to Equation 11.

$$\pi^* = Q^*(s', a'), \tag{11}$$

The optimized policy may be embedded in a radiation hardened processor, which sits on-board a defensive hypersonic missile. After launch, the agent maximizes its reward, defined by engagement with the offensive hypersonic missile by making decisions according to the optimal policy.

In embodiments, initially, the agent is presented with a state of the environment. Then, the agent takes an action in the present state, advancing to the next state of the environment, where a reward associated with the chosen action is returned. The agent acts according to a policy. Generally, an optimal policy is developed to maximize value. In the present disclosure, the optimal policy corresponds with taking the action that maximizes value to the agent. The model progresses to the next state, where the agent receives a reward and is presented with a new set of actions. The agent then selects another action, the environment responds with a reward and transitions to the next state. This iterative process continues until the environment reaches its final state, which in this context is referred to as target impact.

It is to be understood that while certain embodiments and examples of the disclosure are illustrated herein, the disclosure is not limited to the specific embodiments or forms described and set forth herein. It will be apparent to those skilled in the art that various changes and substitutions may be made without departing from the scope or spirit of the disclosure and the invention is not considered to be limited to what is shown and described in the specification and the embodiments and examples that are set forth therein. Moreover, several details describing structures and processes that are well-known to those skilled in the art and often associated with aerospace technologies and missiles or other aerospace weapons are not set forth in the following description to better focus on the various embodiments and novel features of the disclosure of the present invention. One skilled in the art would readily appreciate that such structures and processes are at least inherently in the invention and in the specific embodiments and examples set forth herein.

One skilled in the art will readily appreciate that the present disclosure is well adapted to carry out the objectives and obtain the ends and advantages mentioned herein as well as those that are inherent in the invention and in the specific embodiments and examples set forth herein. The embodiments, examples, methods, and compositions described or set forth herein are representative of certain preferred embodiments and are intended to be exemplary and not limitations on the scope of the invention. Those skilled in the art will understand that changes to the embodiments, examples, methods and uses set forth herein may be made that will still be encompassed within the scope and spirit of the invention. Indeed, various embodiments and modifications of the described compositions and methods herein which are obvious to those skilled in the art, are intended to be within the scope of the invention disclosed herein. Moreover, although the embodiments of the present invention are described in reference to use in connection with rockets or missiles, ones of ordinary skill in the art will understand that the principles of the present inventions could be applied to other types of missiles or apparatus in a wide variety of environments, including environments in the atmosphere, in space, on the ground, and underwater.

I claim:

1. A method for autonomous missile control, the method comprising:

engaging in a trajectory toward a missile target by a missile, using data sensors, receiving data about the trajectory, processing the data in a radiation hardened field programmable gate array, generating a visual mechanism for action value calculation by a reinforcement learning algorithm further receiving the action value calculation in real-time, generating instructions for commanding thrust vector controls by a reinforcement learning algorithm, manipulating the missile body in attitude, roll, pitch, and yaw by thrust vector controls, optimizing guidance and enabling collision avoidance using artificial intelligence technology, the artificial intelligence technology further comprising a neural network and a reinforcement learning computer program, combining a neural network and reinforcement learning algorithm using a deep q-network, controlling the missile during powered flight by a deep q-network, minimizing distance and time from the missile target by thrust vector controls optimized by a reinforcement learning algorithm, and successfully colliding with the missile target directly.

2. The method of claim 1 wherein a reinforcement learning algorithm utilizes two convolutional neural networks for computer vision.

3. The method of claim 1 wherein a reinforcement learning algorithm utilizes a deep neural network for action selection corresponding to thruster control commands optimizing thruster output for target engagement and impact.

4. The method of claim 1 wherein a reinforcement learning algorithm utilizes an artificial neural network for thruster output control by manipulating thrust valves corresponding to controlled propellant release.

5. The method of claim 1 wherein data sensors are inertial navigation and tracking systems.

6. The method of claim 1 wherein data sensors include LiDAR, camera, and video data, aggregating and processing, on board a missile in a field programmable gate array and processing with one convolutional neural network, generating an environment passing, to a trained reinforcement learning agent, taking actions corresponding to optimal control commands.

* * * * *